(12) United States Patent
Marsh et al.

(10) Patent No.: US 9,571,661 B2
(45) Date of Patent: Feb. 14, 2017

(54) CONTROLLER FOR A DOOR ENTRY SYSTEM

(75) Inventors: Gregory Marsh, London (GB); Daniel Townsend, Denbighshire (GB)

(73) Assignee: Klevio Limited, London (GB)

( * ) Notice: Subject to any disclaimer, the term of this patent is extended or adjusted under 35 U.S.C. 154(b) by 49 days.

(21) Appl. No.: 13/434,928

(22) Filed: Mar. 30, 2012

(65) Prior Publication Data

US 2012/0249290 A1 Oct. 4, 2012

(30) Foreign Application Priority Data

Mar. 31, 2011 (GB) .................................. 1105497.0

(51) Int. Cl.
*G05B 19/00* (2006.01)
*H04M 11/02* (2006.01)
(Continued)

(52) U.S. Cl.
CPC ........ *H04M 11/025* (2013.01); *H04L 12/2803* (2013.01); *H04M 9/001* (2013.01); *H04M 11/02* (2013.01); *G07C 9/00309* (2013.01)

(58) Field of Classification Search
CPC .... H04M 11/025; H04M 3/00; H04M 11/007; H04M 2242/08; H04M 2250/18; H04M 3/16; G07C 9/00; G07C 9/00007; G07C 2009/00071; G07C 2009/00087; G07C 2009/00817; G07C 2009/00658; G07C 2009/00753; G07C 9/00039; G07C 9/00174; G07C 9/00103; G07C 9/00658; G07C 9/00857; G07C 2009/00031; G07C 2209/04; G07C 2209/62; G07C 11/00; G07C 2209/02; G07C 9/00182; G07C 2009/00; E05B 39/00; E05B 2003/00; E05B 2035/00; E05B 19/0005; E05B 47/0011
(Continued)

(56) References Cited

U.S. PATENT DOCUMENTS 4,023,139 A 5/1977 Samburg
5,815,557 A 9/1998 Larson
(Continued)

FOREIGN PATENT DOCUMENTS

DE 10 2004 059224 A1 6/2006
GB 2387501 A 10/2003
(Continued)

OTHER PUBLICATIONS

UK Search Report dated Jul. 29, 2011 in corresponding UK Patent Application No. GB 1105497.0, 2 pages.
(Continued)

*Primary Examiner* — Mirza Alam
(74) *Attorney, Agent, or Firm* — Nields, Lemack & Frame, LLC

(57) ABSTRACT

Controller for retrofit connection to a pre-installed door entry system of an area having a communal entrance secured by a communal door having a first electrically operated lock and a non-communal internal region secured by an internal door having a second electrically operated lock, the door entry system comprising a door panel associated with the communal entrance and an entry phone located within the internal region; the controller being connectable to existing circuitry of the entry phone to be able to receive a request for entry into the internal region from the door panel; and transmit an electrical signal to the entry phone to unlock the first and second electrically operated locks. The controller comprises a detector; a verifier; and a lock controller arranged to generate the signals to control the entry phone to
(Continued)

unlock the first and second electrically operated locks when the right of access has been verified.

21 Claims, 9 Drawing Sheets

(51) Int. Cl.
 *H04M 9/00* (2006.01)
 *H04L 12/28* (2006.01)
 *G07C 9/00* (2006.01)
(58) Field of Classification Search
 USPC ....... 340/5.7, 5.26, 5.22, 5.6, 5.62, 5.5, 506, 340/66, 41, 825.44; 713/182; 379/350, 379/169, 413, 102.01; 455/403, 352, 455/151.4, 550
 See application file for complete search history.

(56) References Cited

U.S. PATENT DOCUMENTS

| | | | | |
|---|---|---|---|---|
| 6,185,294 B1* | 2/2001 | Chornenky | ........... | H04M 9/001 379/169 |
| 2002/0147598 A1* | 10/2002 | Smith | ................. | G06Q 20/102 235/379 |
| 2002/0183031 A1 | 12/2002 | Yamagishi | | |
| 2004/0229569 A1* | 11/2004 | Franz | ...................... | H04M 3/16 455/66.1 |
| 2004/0243812 A1* | 12/2004 | Yui | .......................... | G07C 1/10 713/182 |
| 2006/0017547 A1* | 1/2006 | Buckingham | ....... | H04L 12/2816 340/328 |
| 2009/0122970 A1* | 5/2009 | Kearney | .............. | H04M 11/025 379/167.06 |
| 2010/0171600 A1 | 7/2010 | Wu | | |

FOREIGN PATENT DOCUMENTS

| | | |
|---|---|---|
| GB | 2436907 A | 10/2007 |
| JP | 2003-113685 A | 4/2003 |
| JP | 2010-239332 A | 10/2010 |
| WO | 96/05688 A2 | 2/1996 |
| WO | 98/39894 A1 | 9/1998 |
| WO | 02/23881 A1 | 3/2002 |
| WO | 2006/136662 A1 | 12/2006 |
| WO | 2007/012831 A1 | 2/2007 |

OTHER PUBLICATIONS

European Communication mailed Jul. 30, 2012 in corresponding European patent application No. 12162442.3.

* cited by examiner

| | |
|---|---|
| ——— Existing wiring | C1 - V+, Ground |
| - - - - Retrofitted wiring | C2 - V+, Ground, Audio In, Audio Out, Buzzer |
| ))))) ) Mobile link | C3 - V+, Ground, Audio In, Audio Out, Buzzer |
| | C4 - V+, Ground |
| | C5 - Audio In, Audio Out |

----- Copper trace on PCB

To door panel 1:
W1 - Audio In
W2 - Audio Out
W3 - V+
W4 - Ground
W5 - Buzzer

To unit door lock 4:
W6 - V+
W7 - Ground

D1 - Audio in from door panel 1 microphone
D2 - Buzzer
D3 - Door release (front door)
D4 - Door release (unit door)
D5 - Audio out to door panel 1 speaker

CONTROLLER FOR A DOOR ENTRY SYSTEM

This application claims priority of GB 1105497.0 filed Mar. 31, 2011, the disclosure of which is hereby incorporated by reference.

BACKGROUND

The present invention relates to a device and system for augmenting the functionality of a door entry system installed within a premises in a non-destructive way, enabling remote access control of that premises.

In buildings shared by multiple occupants there is often a door entry system installed, the purpose of which is to allow people to open the door entering the building from within their own unit, and to speak to people who are at the entrance of the building over an audio or video interface. The unit could be an apartment, an office, or any other piece of space requiring access control.

These systems are commonly referred to as door entry systems, However they are also marketed as access control systems, and door entry intercoms. They are typically sold as integrated solutions consisting of a door panel, a transformer, and one or more handsets for installation within each unit. The handsets can be wired directly to the door panel at the entrance to the building, or via an intermediate control box. The door panel is wired to some form of electric lock at the entrance to the building.

The door panel consists of at least three elements—a buzzer for each unit with an entry phone installed, and a microphone and a speaker allowing a conversation to take place between a person in the unit and the visitor.

WO2007/012831 discloses a door entry system which provides remote access control and WO98/39894 discloses a system for augmenting communal parts of an existing door entry system for remote access to communal areas.

In situations where an individual unit owner wants to upgrade the functionality that they have access to, they would have to purchase one of these integrated solutions and replace all or part of the existing system. This is because a lot of the functionality of the system is contained within the door panel, rather than the individual entry phones. There are exceptions—for instance, if the existing system supports both audio and video handsets and the unit owner currently has an audio handset installed, then they could replace it with a supported video handset. However, in the vast majority of cases the system is designed for a single handset design, so getting improved functionality is not as straightforward as installing a different handset.

Since door entry systems are spread throughout the entire building, in order to install a replacement a unit owner would require permission to makes changes to the communal area of the building, which is often managed by a third party management company on behalf of the occupants of the building. In other cases the communal area may be managed by an occupant elected by the other occupants. There are other conceivable setups, but the main point is that getting permission to replace the system is an obstacle to making improvements. Furthermore, the changes required are quite invasive, involving installation of a new door panel, as well as wiring and any other support accessories.

Likewise, if the unit owner has access to some sort of sophisticated lock which they want to install at the entrance to the building, then they would also require permission from the relevant parties. A specific example is where a unit owner wishes to control access to their unit when they are not personally present. This could be in response to a tradesman visiting, or a cleaner. For the reasons outlined above, installing a new lock at the entrance, or replacing the entry system would be difficult. The present applicant has appreciated that a device which adds this functionality to the existing system would be favourable, such that the intervention was low impact, and didn't involve any changes to the communal area. This would also have the specific benefit of limiting the number of keys which have to be given out to numerous visitors who may require access to the unit at different points in time.

SUMMARY

The present invention provides a controller which addresses these identified requirements.

The present invention in its various aspects is as claimed in the claims.

There are situations where an entry system isn't already installed, but the present invention still provides benefits. It may be cheaper to acquire a low cost entry system and augment its functionality using the present invention. Furthermore, should the entry system break, the retrofitted unit can be installed onto a new entry phone system.

The present invention consists of a device which can be 'plugged in' to an existing door entry system to enable the visitor, upon pressing the buzzer on the door panel, to listen to a pre-recorded message, speak to a person via a communication channel, and for said person to let the visitor enter the premises remotely. There is also the option of the visitor directly triggering the device, and thus permitting access, via means of an SMS message, or other such method, from their mobile phone.

The device will typically plug in to the existing system using the connection terminals within the entry phone, or by taking the signal cable sent into the entry phone, and placing the device in between such that the signals can be detected by the device before they enter the entry phone.

The device can plug into a number of existing entry systems, and can intelligently recognise a range of different buzzer signals (which may be electronic or analogue in nature) which alert the device to the presence of a visitor. The device adds the functionality non-destructively, meaning that any modifications made to the existing entry system during installation are easily reversible. There is no need to install any new devices or wiring in the communal area of the building or outside—it is all contained within the individual unit, which means that permission is not needed for installation.

Furthermore, while the device is installed the functionality provided by the existing entry system continues to work. This means that people can still be let in manually, and an audio or voice call can still take place between a person within the unit and a visitor at the entrance to the building.

When the buzzer on the door panel is pressed for any of the other units then the entry system will perform in the same manner as if the device wasn't installed. When the buzzer is pressed for the unit with an active device installed, then this triggers the functionality afforded by that device, which results in audio playback amongst other things.

One of the key functions of the device is to enable remote access control for a unit. The device permits a number of novel ways of verifying the visitor. These include detecting a predefined sequence of buzzer presses which permits access. This requires the visitor to press the buzzer a certain number of times, in a certain pattern. For instance, longshort-long-short-short-short, where long and short refer to the length of time the buzzer is pressed for.

Other verification methods are also possible, such as via a phone call, which is established by the device after the buzzer has been pressed. These include a range of manual and automated methods, such as asking for a password.

When the primary use of the device is to enable access control to a unit, there may be times when verification is not required e.g. if a visitor is not expected. In this situation the device can be put into sleep mode, during which the entry system acts as though the device wasn't installed.

This means that remote opening of the lock is no longer possible, and pre-recorded messages are no longer played etc. until such a time that the device exits from sleep mode. The device can be put into and out of sleep mode either manually, or via the receipt of a token over a communication channel, such as the cellular network. This token could be an SMS message, containing a text command and password.

It is conceivable that a number of these devices could be installed in different units. For example, a holiday let business could put such a device in each property under their management. These devices can be controlled via an application running on a remote computing device, which will wake up the device from sleep mode at certain times by sending the relevant token. This could be in response to a booking made on a website, so that the device is only functioning for the period of time when a visitor is expected.

Further capabilities include the remote update of the firmware running on the device, to add further capabilities with time, which is sent via a communication channel such as GPRS.

BRIEF DESCRIPTION OF THE DRAWINGS

The invention will now be described solely by way of example and with reference to the accompanying drawings in which.

DETAILED DESCRIPTION

The present invention consists of a device, and supporting system, which allows the functionality of an existing door entry system to be augmented non-destructively.

Entry systems are installed in a range of different buildings, both commercial and residential. For instance, in a building which contains one or more apartments, where the entry system is used to let visitors into the communal area. Another example is in a commercial building, where a door entry system is used by a receptionist to let people in to the building. Entry systems can also be used to control access to boats and exterior spaces.

For the present discussion, a residential building will be considered, which consists of multiple apartments, with access to the building via a single communal door, followed by a door to each individual apartment. It is also assumed that there is an entry system already installed, which is used to open the communal door from within each of the apartments.

Figure 1:
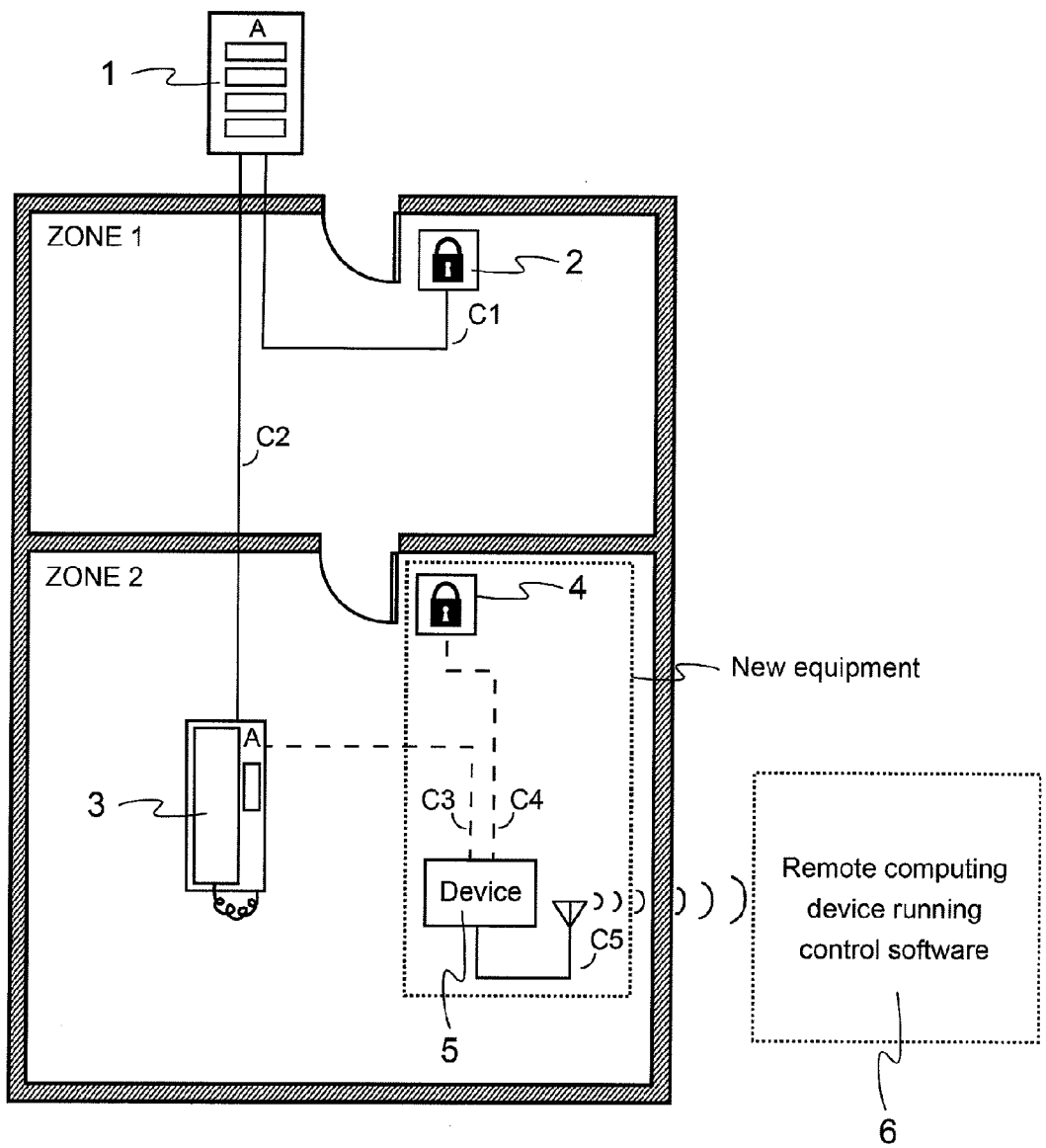
FIG. 1 shows how the device is positioned within the flat, and extends the existing entry system.

A simplified diagram of this is shown in FIG. 1. The device 5 has been installed onto an existing door entry system consisting of an entry phone 3 and a door panel 1 which is connected to an electric lock 2 at the communal door. A second electric lock 4 has been installed for controlling the apartment door. The cables are labelled to show the signals which they carry. Zone 1 is the communal area which requires permission before making modifications, and Zone 2 is the apartment, within which the owner can make any modifications they require. The device 5 is shown attached to an antennae, which allows communication to be established with a remote computing device 6. This is a specific implementation of the present invention—as will be mentioned later, the communication channel needn't be wireless.

Figure 2:
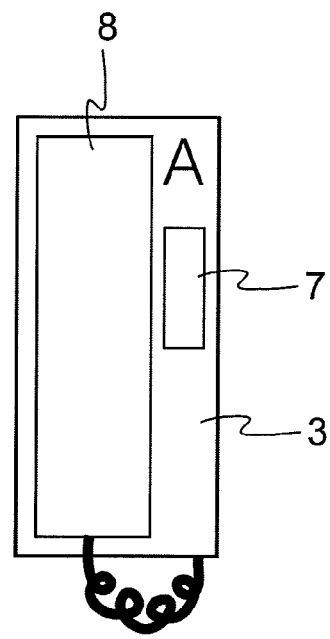
FIG. 2 shows a typical entry phone.

FIG. 2 shows a common design of entry phone 3, which consists primarily of a handset 8 for speaking to a person at the door panel 1, and a door release button 7. When the door release button 7 is pressed, one of the following takes place—a circuit is closed which enables the electric lock 2 installed at the communal entrance to open, or an open token is sent to the door panel 1 which causes a circuit to close, and hence the lock 2 to open.

There are numerous different types of electric locking mechanisms available commercially. A common implementation is an electric strike, however electromagnetic locks, and electromechanical bolts are also used. A lock with an electric strike can either be opened with a key, or if a certain voltage is applied to the electric strike, then the door can simply be pushed open.

Figure 8:
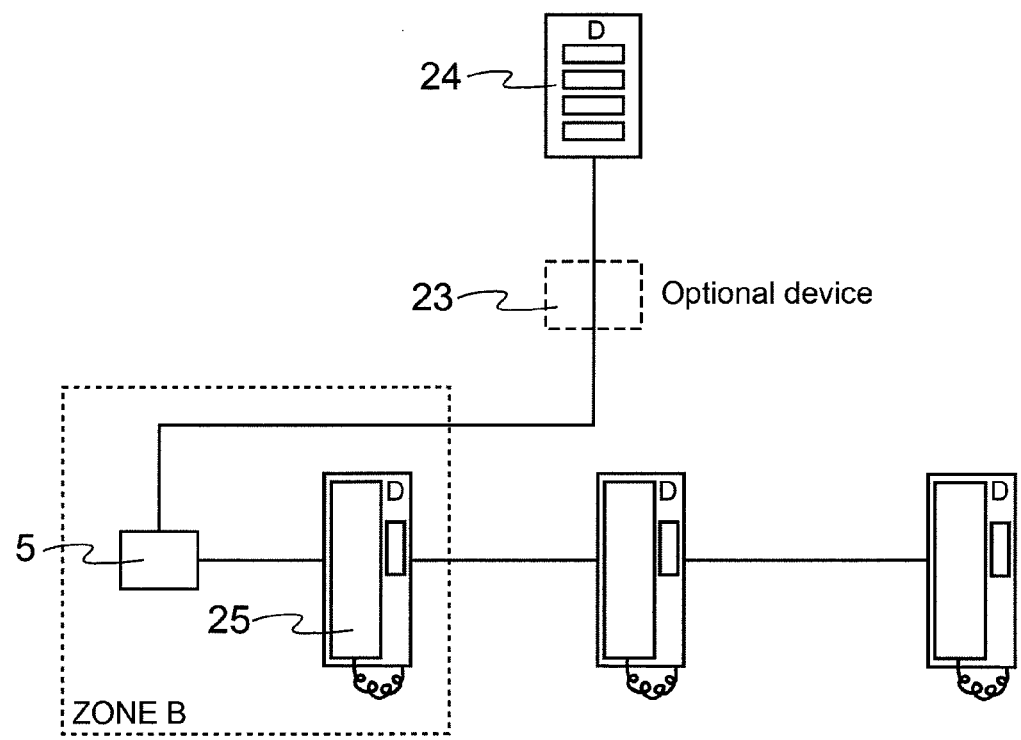
FIG. 8 shows an entry phone system in a daisy chain network with the present invention installed.
Figure 9:
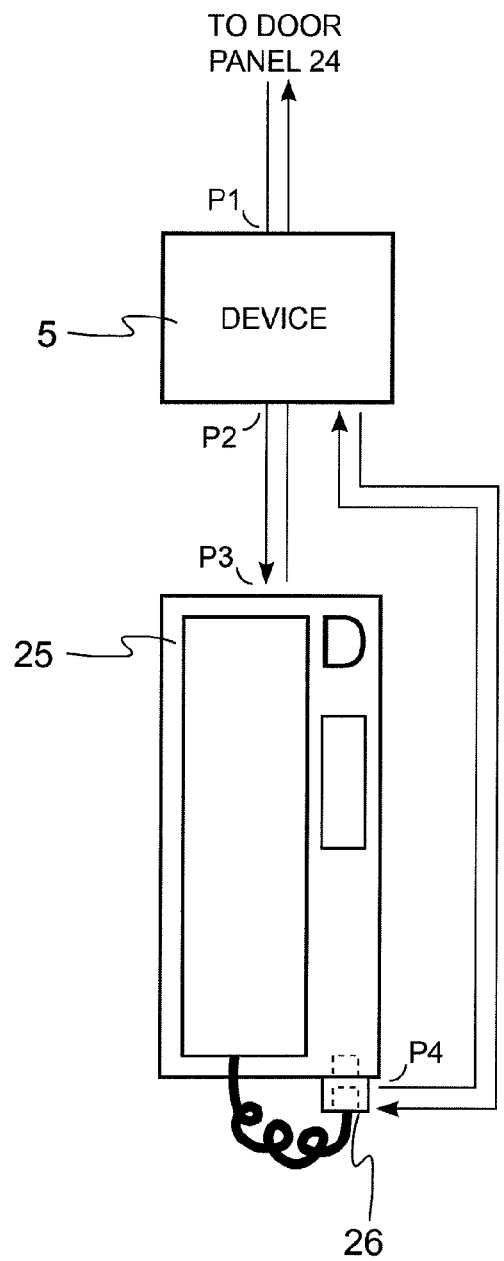
FIG. 9 shows a method of interfacing with digital entry phones.
Figure 9:
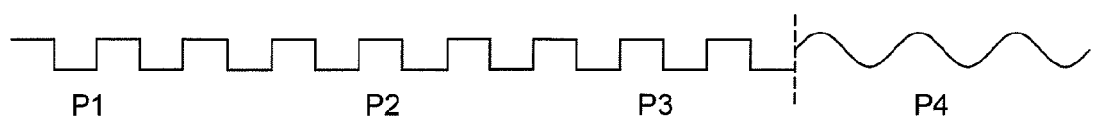
Figure 10:
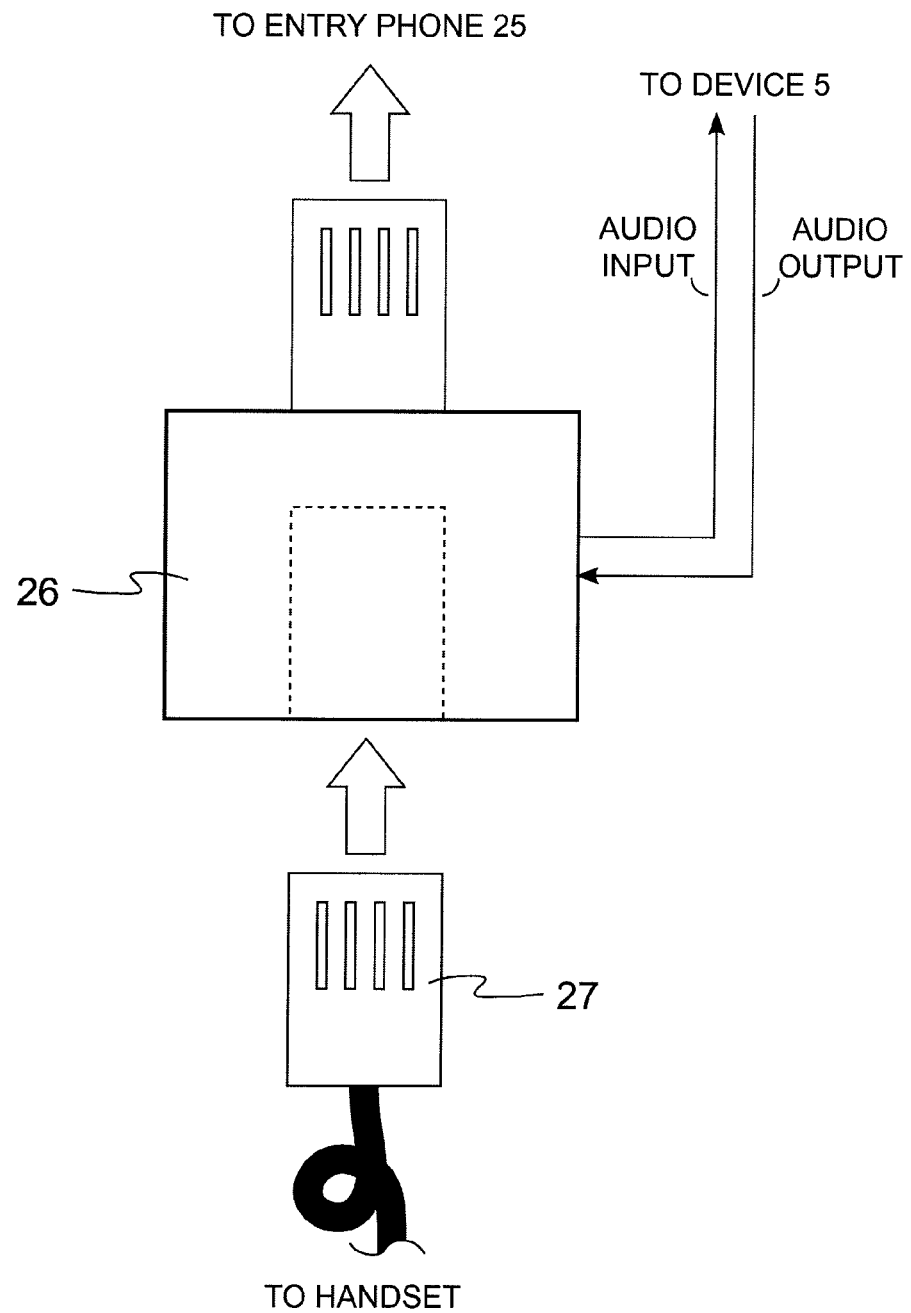
FIG. 10 shows an adapter which can be used for interfacing with entry phones.

Notice the letter A on the entry phone 3, which indicates it's an analogue entry phone. Entry phone 25 in FIGS. 8 and 9 is labelled with a D to indicate it's a digital entry phone. It's important to make this distinction, because some of the techniques discussed are more relevant to either analogue or digital entry systems.

In analogue entry systems, analogue signals are sent between the entry phone 1 and door panel 1, typically with one wire for each signal. Five wire systems are a common implementation.

In the case of digital systems, digital data is sent between the entry phone 25 and the door panel 24, along one or more wires.

Clearly, digital and analogue systems are not compatible with each other i.e. a digital entry phone can't be connected to an analogue door panel, and vice versa.

Figure 3:
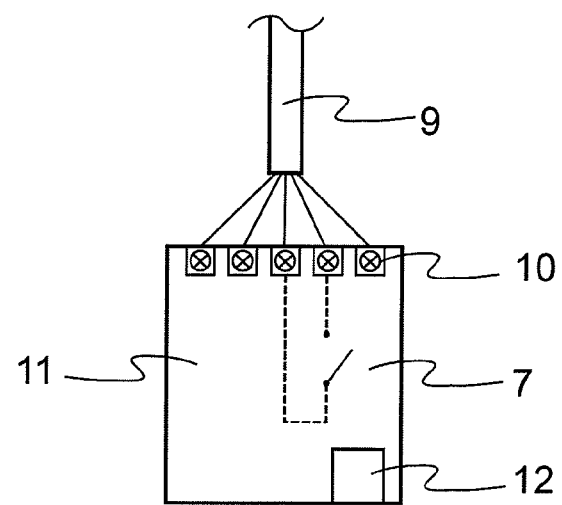
FIG. 3 shows a simplified example of the circuit contained within a device like that in FIG. 2.

FIG. 3 shows a simplified representation of the circuit board 7 inside of the entry phone 3. It contains a mechanism for securing the wires sent into the entry phone, which is commonly a row of screw terminals 10. These wires are carried in a multicore cable 9 which usually comes directly from the door panel 1.

The number of screw terminals 10 varies between devices, but a common requirement is for at least 5 terminals, which each accepts a wire. The purpose of these five wires is as follows, with one wire performing one of the following functions: audio in, audio out, ground, positive potential (commonly 12 V a.c.), and a buzzer.

Devices are available which operate with fewer wires, and while the device can support these, the current discussion will use a 5 wire system as an example. Furthermore, the function of the wires can vary from that outlined above, such as in case of an analogue entry phone with an electronic ring tone, where the buzzer signal is sent along the audio in line, rather than having a dedicated buzzer wire. This causes the buzzing sound to be created by the speaker in the handset of the entry phone, as opposed to having a mechanical buzzer in the case of purely analogue systems, which vibrates when an alternating current is applied to the buzzer wire. In order to avoid confusion, systems with electronic ring tones will from now on be referred to as electronic entry phones.

The circuit board also contains some form of socket 5 for attaching a handset. This is commonly a 4P4C socket, and is standardised across most entry phones.

Figure 4:
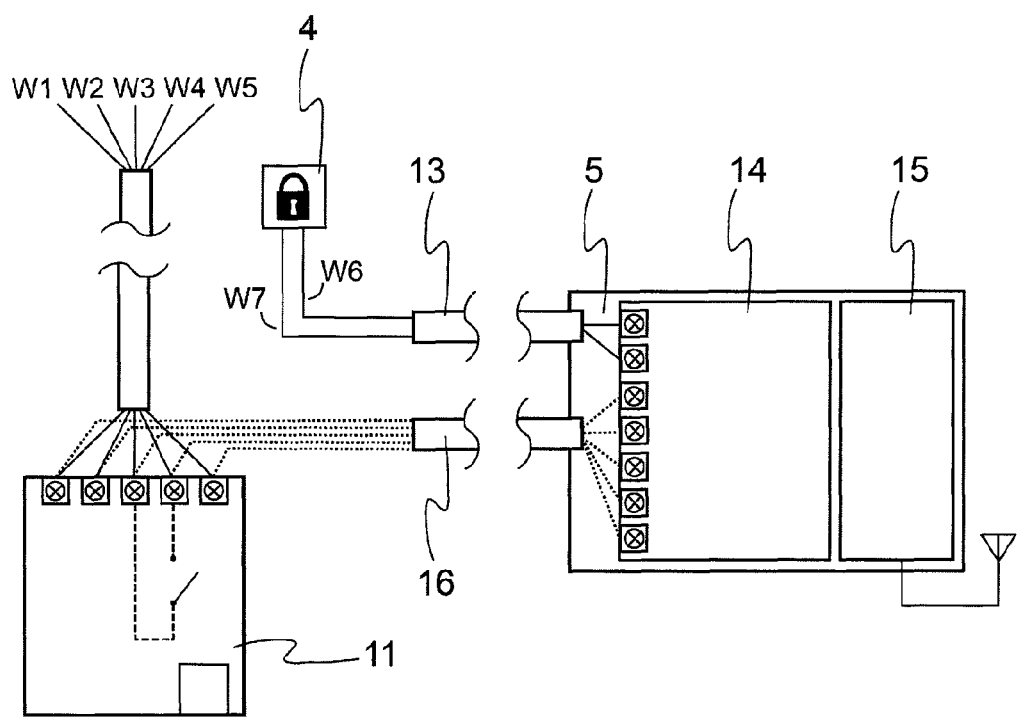
FIG. 4 shows a way in which the device can plug into the existing entry phone.

FIG. 4 shows how the device 5 can interface with a 5 wire analogue entry phone 3. This involves sending a multicore cable 9 into the existing entry phone 3, and securing a wire from the cable into each of the screw terminals, alongside the existing wires. The other end of the cable is sent into the device 5, and each of the wires which have been connected inside the entry phone 3 are also connected inside the device 5, with each wire connected to a screw terminal.

The device 5 has two main sets of functionality, which are shown as two separate circuit boards 14 and 15 in FIG. 4, but could equally be a single circuit board. Circuit board 14 filters the input from the entry phone, detects any changes in the signals, and communicates with a modem 15. This is a circuit which provides the means of communication with a remote human or computing device. The modem could be a means of connecting to the internet, via an Ethernet cable or similar means. Alternatively, it could be a wireless module which connects to the internet, and/or cellular networks. The present embodiment of the invention utilises a wireless module with access to the cellular network.

The wireless module 15 could implement any available wireless standard, however the implementation outlined here utilises a GSM/GPRS module. This permits voice data to be transmitted back and forth to a remote unit, and for duplex transfer of textual and binary data via SMS, TCP/IP, fax, and any other supported means. The advantages of using GSM/GPRS relate to the wide coverage of cellular networks, permitting the use of the device 5 in a number of different contexts, with few limitations relating to geography, and network hardware installed within the building.

Once the device 5 is plugged into the existing system and is enabled, it has the ability to trigger the electric lock 2 at the front door by closing the circuit which would usually be performed by a user pressing the door release button 7 on entry phone 3.

The device 5 also has the capability of controlling a second electric lock 4 by running a two core cable 13 between them. In some situations the second electric lock 4 will already be installed, and in others it will need to be fitted at the same time as the device 5. The second electric lock 4 will typically be for the apartment door.

A good practice when installing device 5 with a second electric lock 4, is to select a lock with closely matching electrical characteristics to the already installed electric lock 2. This means that the device can use the already existing positive potential used to trigger the electric lock 2 (commonly 12 V a.c.) to also trigger the second electric lock 4.

Triggering of the electric locks is performed using relays which are contained inside device 5. The device 5 has the ability, on receiving a valid token over the wireless link, to open either the first electric lock 2, the second electric lock 4, or the first followed by the second after a determined time has elapsed.

The remaining connections which are made between the entry phone 3 and device 5 carry audio input, audio output, and the buzzer signal. The audio input is what a user would hear if they were listening to a visitor at the door panel 1 using the entry phone 3. The audio output is what the user speaks into the handset of the entry phone 3, and is what the visitor hears via the door panel 1. The buzzer wire carries a signal when a visitor presses the buzzer on the door panel 1.

Figure 5:
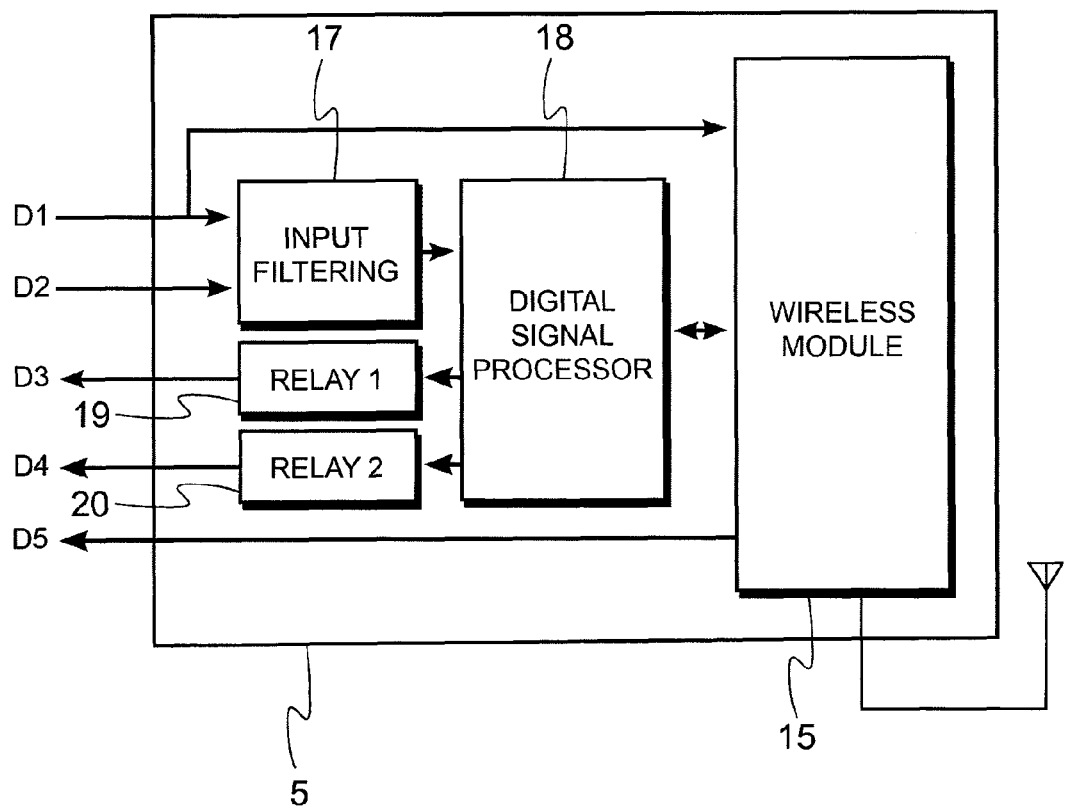
FIG. 5 shows a way in which the device can be implemented, with some of the main functional components.

FIG. 5 is a simplified representation of the device 5. Together, the input filtering 17, the two relays (19 and 20), and the Digital Signal Processor (DSP) 18 make up the interfacing electronics 14 shown in FIG. 4. The two relays each control an electric lock.

In order for the device 5 to detect a buzzer signal, the signal must first be filtered. The nature of this filtering depends on whether an analogue entry system is being used (in which case the buzzer is typically a 12 V a.c. signal), or an electronic system (in which case the buzzer signal is carried on the same wire as the audio in, and typically consists of a square wave superimposed on a carrier signal).

If the buzzer signal is analogue, then by rectifying and smoothing the signal, and sending it through an optocoupler, the DSP 18 can detect it based on a change in voltage level.

When the buzzer signal is electronic then the square wave needs to be isolated from the carrier signal using a band pass filter. This square wave can then be detected by the DSP 18 using edge based interrupts i.e. each time an edge of the square wave is detected at the input of the DSP the current time is captured. After detecting many such events it is possible to assess the periodicity of the signal. If the signal displays a high level of periodicity then this suggests that the buzzer is being pressed, and is not just random noise.

Furthermore, in an electronic system where the buzzer signal is on the audio input line, the detection algorithm needs to distinguish the buzzer from the audio data, otherwise the unit could be falsely triggered while a call is taking place.

If the buzzer is detected then the wireless module 15 sends the audio input to a remote person or computer system via a phone call, and receives the returned audio data, and sends it to the front door speaker via the audio output line. It also has the capability of playing pre-recorded audio samples, which are stored on the device 5, or transmitted via the wireless link, which are sent via the audio output line to the door panel 1 speaker.

The wireless module 15 can also establish data connections with a remote computer terminal, which enables it to receive tokens from the remote computer terminal for opening the electric lock(s), amongst other functions.

There are a number of ways to perform verification of the guest. This will now be outlined with reference to FIG. 6, which is one example of how it can be achieved. When the guest arrives, they press the buzzer on the door panel 1 installed at the property (S2 in FIG. 6). After the visitor has pressed the buzzer an audio message is played back asking them to press the buzzer once more S6. This is a necessary verification step which gives the visitor the chance to abandon the process before any more system overhead is incurred. This results in a call being made to a computerised telephone system where the guest is verified.

There are a number ways to achieve this—the visitor can be asked for a password which they were previously provided with, which is recognised using voice recognition software. Alternatively, the guest can be asked to send their password via SMS to a telephone number, where it is verified. The computerised system can be replaced by people who receive the call, and perform manual verification.

If the visitor is verified then a remote computer terminal 21 (a server in this case) sends an open token to the device 5 which triggers the relevant relays, and opens the door.

An important requirement for the device 5 is to receive this token and any other data in a secure manner from the server 21. One implementation is to send the token via SMS, along with a password. The device 5 checks whether the telephone number from which the SMS is sent is correct, and verifies that the password is also correct. If both cases are true, then device 5 implements the standard response to that token, such as opening the electric lock.

This password can be generated by an algorithm which takes account of the current time and date. If this algorithm is implemented on both the server 21 sending the SMS, and also on the device 5, then a much more secure system is possible than if the same password was used each time. If the password generated by the device 5 matches the password sent by the server 21, and the telephone number is correct, then the token is accepted.

Alternatively, the data channel which is used to send tokens can be encrypted, as long as the process of decryption isn't too computationally expensive for the device 5, which must act as a near real time system.

Figure 6:
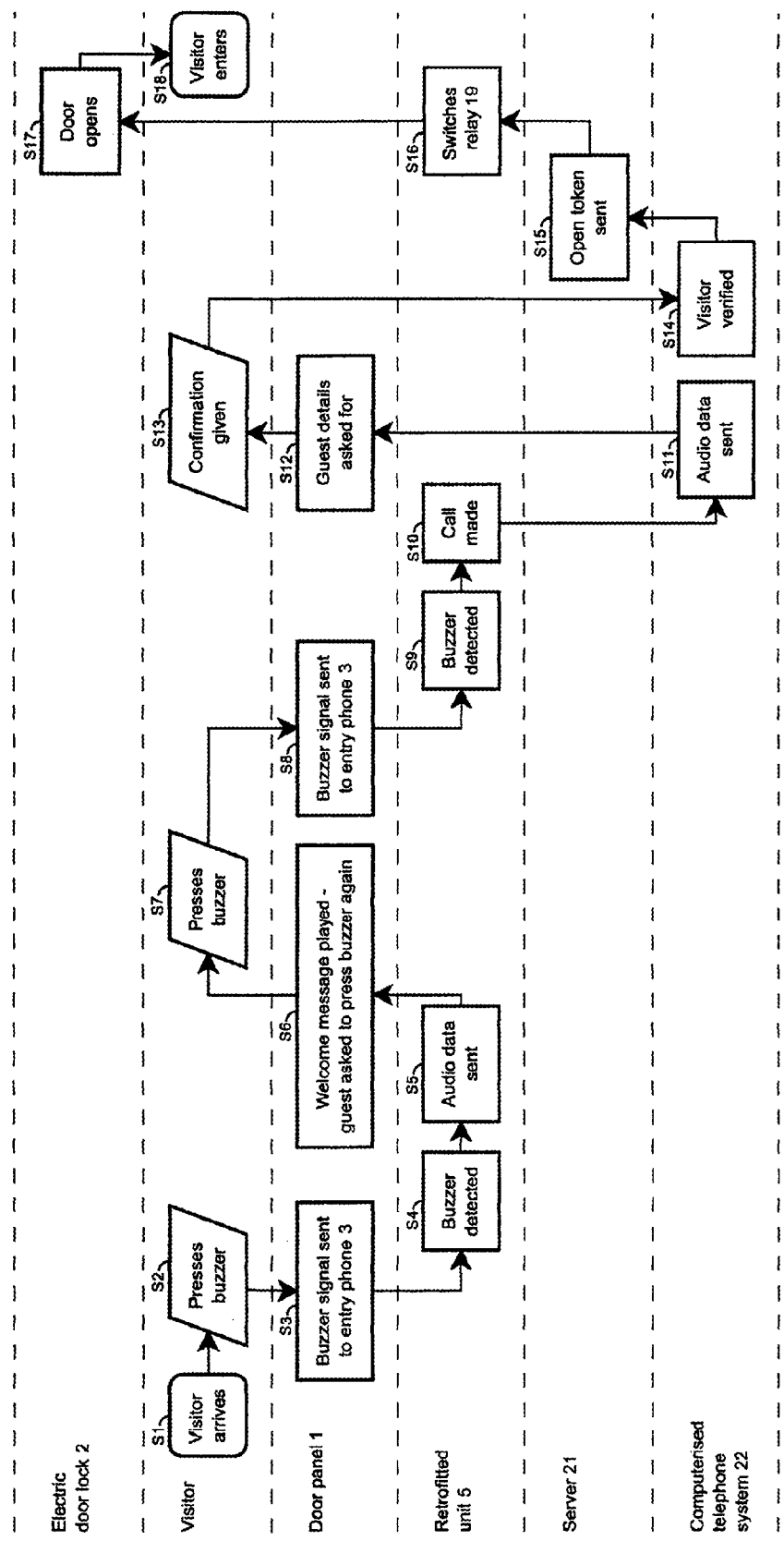
FIG. 6 shows the use of the device to detect a visitor at the entrance to the building, which triggers a sequence of events resulting in the electric lock at the entrance opening, and the visitor gaining access.

It is worth considering some other verification methods, which are not outlined in the example implementation of FIG. 6.

There are methods which utilise the existing entry system to allow verification to take place. As previously mentioned, pressing the buzzer in a certain pattern could act as a verification method. Alternatively, an audio token available on the visitor's mobile computing device could be played into the microphone of the door panel.

If there is a local wireless network established within the building, the visitor could enter their identification information in a web form or application running on a mobile computing device which they carry. This information is then verified either locally by device 5 against a set of records of expected visitors, or by a remote computing device 6. Similarly, verification could be performed by sending an electronic message such as SMS to a certain address, or by entering information via a cellular or internet portal.

It is even conceivable that the visitor carries a wireless identifier such as a powered RFID tag, which communicates with a reader positioned within Zone 2 in order to provide verification. Or any other such means which performs verification without installing any new hardware into Zone 1.

In order to power the device 5, a number of options are possible. In the case of analogue entry systems, the power available on the positive potential wire (which is used to release locks 2 and 4) is often sufficient to power device 5. This requires converting the voltage to the correct level for use by the electronics in device 5. An installer may optionally chose to use a power socket instead.

With digital entry systems, there may not be sufficient power available from the existing entry phone to power the device 5. Furthermore, there may not be sufficient power to support an additional electric strike 4. In this case a power socket is highly desirable, provided one is available nearby. If not, then some form of onboard power must be used, such as a battery.

Door entry systems are available in a number of different networking topologies (bus, star, daisy chained etc). However, there are two main ways in which to interface the device 5 with the existing network, as shown in FIG. 7 and FIG. 8.

Figure 7:
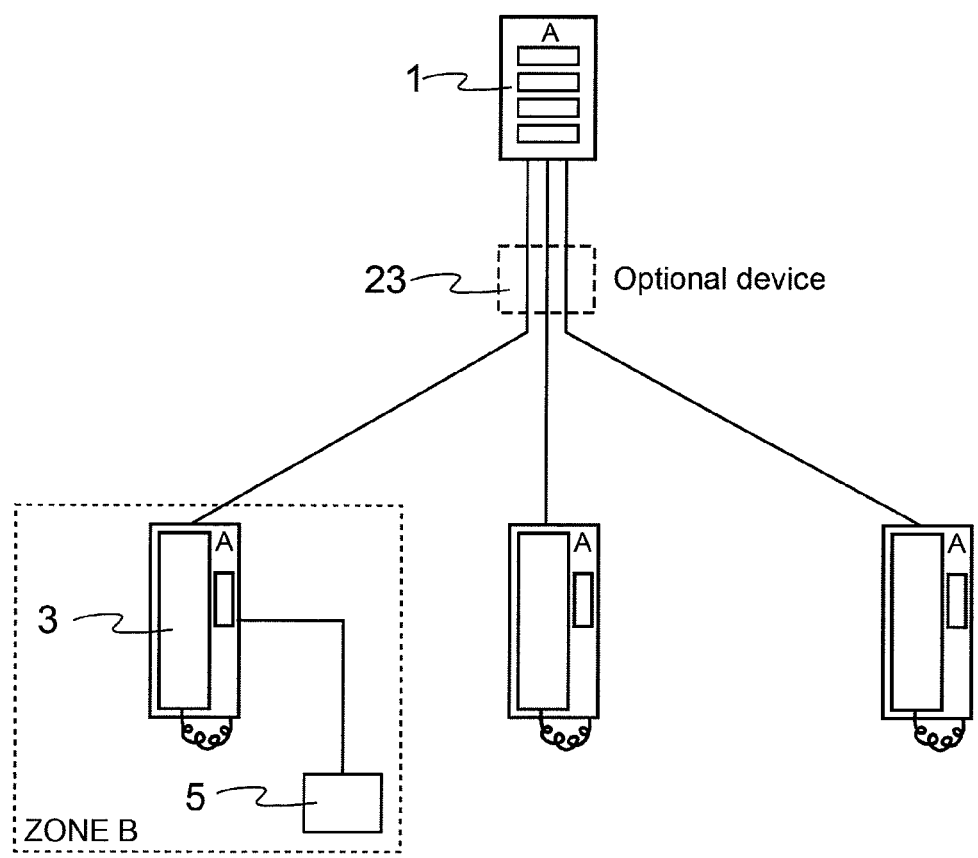
FIG. 7 shows an entry phone system in a star network with the present invention installed.

In FIG. 7 the device 5 interfaces using the internal connectors inside the entry phone 3. In FIG. 8 the signal cable is passed into the device 5, and then into the entry phone 25.

In both cases the retrofitted unit 5 is placed within the unit belonging to the owner without affecting the entry phones installed within any of the other units.

In some configurations the entry phones are wired directly to the door panel, and in others there is an intermediate control box 23, which transmits the signals to the door panel. This is more common for digital systems.

The implementation of the invention is complicated by the usage of digital entry systems. Such devices sometimes use just two wires, as opposed to the more common 5 wire system. Each wire carries digital data in one direction between the entry phone and a control unit installed somewhere within the building. The control box 23 or door panel 24 then interprets the digital data coming from the entry phone, and takes relevant action. For instance, converting digital audio data into an analogue form, or interpreting an electric lock open command and actually opening the electric lock.

In order to successfully control an existing digital entry system, device 5 implements a more sophisticated algorithm, which allows 'packet sniffing' where the data sent for each command, for instance for opening the electric lock 2, is captured, saved to memory, and recreated when the relevant token is received over the wireless link.

The DSP 14 can implement such functionality, but requires a learning mode, where the installer goes through a process of teaching the device 5 the relevant commands. This involves pressing a buzzer learn button on device 5, and then pressing the buzzer on the entry system. Alternatively, the data can be stored into the device 5 memory if the relevant commands have been acquired by other means.

In terms of capturing audio data being sent to the entry phone, an adapter can be used, as shown in FIG. 9. The entry phone 25 takes the digital audio data sent from the door panel 24 or control box 23, and turns it into an analogue signal. Entry phones commonly use a 4p4c socket for attaching a handset. Any signals at this point have been converted into analogue, and are easier for the device 5 to deal with. So if the relevant buzzer command can't be extracted from the digital input data, it can still be detected using this adapter. Furthermore, any audio input or output to the handset can also be extracted in an analogue form.

The adapter has a female socket for accepting the 4p4c connector 27 on the handset, which connects to a 4p4c connector for plugging into the entry phone. The signals are extracted within the adapter and sent to the device 5.

Furthermore, in order to send audio data to the front panel, an audio output signal can be sent from the device 5 into the adapter, and thus through the entry phone, where it is converted to a digital form and sent to the door panel or control box.

Clearly there are more unknowns when it comes to digital systems. The digital data could be sent using a number of different protocols. However, an implementation of the current invention can be designed such that the digital entry system can still be enhanced, and the primary requirements of remote access control can still be implemented.

If audio data cannot be successfully extracted from the entry phone, and sent to the front panel either digitally or via the adapter, then there are fall back measures which mean that the device still works in some form. As long as the buzzer can be detected (either digitally, via the adapter, or through some other means such as a microphone), and the door release command can be extracted, then access control can still be implemented using one of the alternative verification methods outlined above.

In order to accommodate these different possibilities, a single implementation of the device 5 can be used, where on-site configuration can be undertaken through software, or using jumpers on the interfacing electronics 14, or by similar means. Alternatively, multiple embodiments of the current design can be implemented, where each solves for a certain use case. However, one of the key advantages of the present invention is that a single hardware implementation can support a range of entry systems, with a minimum of on-site configuration.

The invention claimed is:

1. A controller adapted for retrofit connection to a pre-installed door entry system of an area having a communal entrance secured by a communal door having a first electrically operated lock and a non-communal internal region secured by an internal door having a second electrically operated lock, the door entry system comprising a pre-installed door panel associated with the communal entrance, an entry phone located within the internal region and a plurality of wires electrically connecting said entry phone to said door panel, said plurality of wires having at least request for entry, audio in and audio out functionality; the controller being connectable to said plurality of wires and positioned within the non-communal internal region, the controller being configured to:
   receive a request for entry into the internal region from the door panel via said plurality of wires;
   transmit an electrical signal through said plurality of wires to unlock the first electrically operated lock and transmit an electrical signal to unlock the second electrically operated lock through a wire different from said plurality of wires; the controller comprising:
   a detector arranged to detect the request sent over said plurality of wires for entry by a person;
   a verifier arranged to verify the right of access of the person into internal region; and
   a lock controller arranged to generate the signals to unlock the first and second electrically operated locks when the right of access of the person into the internal region has been verified.

2. The controller of claim 1, in which the verifier is arranged to determine if a predetermined sequence of requests for entry are generated by the door panel.

3. The controller claim 1, in which the verifier is arranged to receive a wirelessly transmitted verification message.

4. The controller of claim 3, in which the verification message is an SMS text message.

5. The controller of claim 4, in which the verification message includes a predetermined password.

6. The controller of claim 1, which is arranged, on receipt of a request for entry, to establish a wireless connection to a second person and the verifier is arranged to verify the right of access of the person into the interior region with the second person.

7. The controller of claim 1, which is arranged to transmit a pre-recorded message to the door panel for onward transmission via a loudspeaker.

8. A door entry system of an area having a communal entrance secured by a communal door having a first electrically operated lock and a non-communal internal region secured by an internal door having a second electrically operated lock, the door entry system comprising a pre-installed door panel associated with the communal entrance, an entry phone located within the internal region, a plurality of wires electrically connecting said entry phone to said door panel, said plurality of wires having at least request for entry, audio in and audio out functionality, and a controller adapted for retrofit connection to the door-entry system, the controller being positioned within the non-communal internal region and connected to the plurality of wires and being configured to:
   receive a request for entry into the internal region from the door panel via said plurality of wires;
   transmit an electrical signal through said plurality of wires to unlock the first electrically operated lock and transmit an electrical signal to unlock the second electrically operated lock through a wire different from said plurality of wires.

9. A method of retrofitting a controller adapted for retrofit connection to a pre-installed door entry system of an area having a communal entrance secured by a communal door having a first electrically operated lock and a non-communal internal region secured by an internal door having a second electrically operated lock, the door entry system comprising a pre-installed door panel associated with the communal entrance, an entry phone located within the internal region and a plurality of wires electrically connecting said entry phone to said door panel, said plurality of wires having at least request for entry, audio in and audio out functionality; the method comprising connecting the controller to said plurality of wires and positioning the controller within the non-communal internal region the controller being configured to:
   receive a request for entry into the internal region from the door panel via said plurality of wires;
   transmit an electrical signal through said plurality of wires to unlock the first electrically operated lock and transmit an electrical signal to unlock the second electrically operated lock through a wire different from said plurality of wires.

10. A method of operating a door entry system as claimed in claim 8, comprising:
    a person using the door panel to generate a request for entry into the interior region;
    the person providing verification information; and
    the person entering the area and the internal region after the first and second electrically operated locks have been unlocked by the controller after the controller has carried out the steps of:
    detecting the request for entry by a person;
    verifying the right of access of the person into the interior region; and, on verification of the right of access,
    unlocking the communal door; and
    unlocking the internal door.

11. The method of claim 10, including operating the door panel to generate the verification information.

12. The method of claim 10, including wirelessly transmitting verification information to a remote computing device or person.

13. The method of claim 12, in which the verification information is an SMS text message.

14. The method of claim 13, wherein said verification information includes a predetermined password.

15. The Controller of claim 1 wherein the controller is configured to open the first electrically operated lock first, followed by opening the second electrically operated lock after a determined time has elapsed.

16. The door entry system of claim 8 wherein the controller is configured to open the first electrically operated lock first, followed by opening the second electrically operated lock after a determined time has elapsed.

17. The method of claim 9 wherein the first electrically operated lock is opened first, followed by the second electrically operated lock being opened after a determined time has elapsed.

18. The controller of claim 1, wherein said pre-installed door entry system has an original functionality, and whereby the retrofitting connection to said pre-installed door entry system changes said original functionality non-destructively, so that such original functionality is restored upon removal of said controller.

19. The method of claim 9, wherein said pre-installed door entry system has an original functionality, and whereby the retrofitting connection to said pre-installed door entry system changes said original functionality non-destructively, so that such original functionality is restored upon removal of said controller.

20. The controller of claim 1, wherein there are a plurality of non-communal internal regions, each secured by a respective internal door having an electrically operated lock and each having a respective entry phone, and wherein said pre-installed door entry system has an original functionality, whereby the retrofitting connection to said pre-installed door entry system changes said original functionality only with respect to the non-communal internal region where said controller is installed.

21. The method of claim 9, wherein there are a plurality of non-communal internal regions, each secured by a respective internal door having an electrically operated lock and each having a respective entry phone, and wherein said pre-installed door entry system has an original functionality, whereby the retrofitting connection to said pre-installed door entry system changes said original functionality only with respect to the non-communal internal region where said controller is installed.

\* \* \* \* \*